United States Patent [19]

Fujimatsu et al.

[11] Patent Number: 4,716,002
[45] Date of Patent: Dec. 29, 1987

[54] METHOD OF PRODUCING A FLAME-RETARDANT ACRYLIC COPOLYMER

[75] Inventors: Masaaki Fujimatsu; Toshiyuki Kobashi, both of Okayama, Japan

[73] Assignee: Japan Exlan Company Limited, Osaka, Japan

[21] Appl. No.: 823,296

[22] Filed: Jan. 28, 1986

Related U.S. Application Data

[62] Division of Ser. No. 568,922, Jan. 6, 1984, Pat. No. 4,604,428.

[30] Foreign Application Priority Data

Jan. 10, 1983 [JP]  Japan ................................. 58-2596

[51] Int. Cl.$^4$ ................................................ D01F 6/18
[52] U.S. Cl. ...................................... 264/182; 525/276
[58] Field of Search ........................................ 264/182

[56] References Cited

U.S. PATENT DOCUMENTS 2,746,944   5/1956   Naps et al. .......................... 525/273
4,075,075   2/1978   Sakurada et al. .................... 264/182

Primary Examiner—Jacob Ziegler
Attorney, Agent, or Firm—Wenderoth, Lind & Ponack

[57] ABSTRACT

This invention relates to a method of producing a flame-retardant acrylic polymer by polymerizing, in the presence of a radical polymerization initiator, a vinyl monomer containing acrylonitrile in an amount of more than 75 weight %, in an aqueous medium in which is present a halogen-containing polymer latex substantially free from an emulsifier. The acrylic polymer can provide flame-retardant shaped products, especially fibers, which have no problems in the operation of spinning, transparency, gloss, dyed color clearness, etc.

6 Claims, No Drawings

METHOD OF PRODUCING A FLAME-RETARDANT ACRYLIC COPOLYMER

This application is a division of Ser. No. 568,922, filed Jan. 6, 1984, now U.S. Pat. No. 4,604,428.

BACKGROUND OF THE INVENTION

1. Field of the Invention

The present invention relates to a method of producing a flame-retardant acrylic polymer, and more particularly to a method of producing an acrylic polymer which can provide acrylic fibers, etc. having excellent flame retardancy, without impairing the intrinsic properties of the acrylic polymer. The method comprises polymerizing acrylonitrile (hereinafter referred to as AN) in a halogen-containing polymer aqueous latex.

2. Description of the Prior Art

Acrylic fibers have a wool-like bulky touch, excellent physical properties, excellent dyed color fastness and dyed color clearness, and therefore they are used in wide fields of applications. However, since acrylic fibers are flammable like other natural and synthetic fibers, it is strongly demanded to give acrylic fibers flame retardancy in special uses, for example, interior furnishing such as carpets, curtains, etc. and clothing for babies and children.

Therefore, in recent years, there have been attempted various methods to make acrylic fibers flame-retardant, and the following methods have been proposed, for example: a method of post-treatment with a flame retardant; a method of copolymerizing a flame retardant monomer with AN; a method of blend-spinning a flame-retardant polymer with an AN (co)polymer, etc.

However, in the case of the post-treatment method, there are problems in washing fastness, touch of the fibers, etc.

In the case of the copolymerization method, although the flame retardancy can be improved by increasing the copolymerization ratio of the flame-retardant monomer, the limit of the flame-retardant monomer is at most from 20 to 25 weight %, so as to dissolve the copolymer in an inorganic solvent. When using an organic solvent, the copolymerization ratio can be increased to about 45 weight % to improve flame retardancy, but undesirable problems are then caused such as delustering, coloring, dyed color unclearness, lack of bending elasticity.

In the case of blend-spinning, for example when a vinyl chloride latex is blended with an acrylic spinning solution, especially in a spinning solution using an inorganic solvent, the latex agglomerates, and in the spinning step, spinnerette clogging and filament breakage upon stretching are frequently caused. Accordingly as in Japanese Patent Publication No. 42884/1977 filed by the Assignee, methods have been proposed to overcome this problem, by using a latex produced in the presence of a specific water-soluble polymer. Although some improvement can be attained by such methods, there is naturally a limit of the quantity of latex to be mixed. Therefore, even by such a method, it is still difficult to produce highly flame-retardant fibers, and because of poor compatibility of AN (co)polymer with vinyl chloride polymer, such a method still involves problems to be solved in practical properties such as transparency, gloss, dyed color clearness, etc.

SUMMARY OF THE INVENTION

In such a situation, we conducted research to overcome the above-mentioned problems and to obtain a method of producing an acrylic polymer capable of providing acrylic fibers which have excellent flame retardancy and satisfactory other practical properties. As a result, we have found that, when AN is polymerized in a halogen-containing polymer aqueous latex, the compatibility of the generated AN polymer with the halogen-containing polymer is remarkably improved. The present invention has been accomplished on the basis of this discovery.

Therefore, the object of the present invention is to provide a method of producing an acrylic polymer capable of providing shaped products such as fibers having excellent flame retardancy and no problems in spinning, transparency, gloss, dyed color clearness, etc., by improving the compatibility of the halogen-containing polymer, a flame retardant polymer, with the AN (co)polymer and by causing the flame-retardant polymer to take a structure in which the flame-retardant polymer is finely dispersed and occluded in the AN(co)-polymer.

This object of the present invention can be attained in an industrially advantageous manner by polymerizing, in the presence of a radical initiator, a vinyl monomer containing more than 75 weight % of AN in an aqueous medium in which is present a halogen-containing polymer latex substantially free from an emulsifier.

DETAILED DESCRIPTION OF THE INVENTION

In the following, the present invention is explained in detail. Firstly, we explain about the halogen-containing polymer latex to be present in the polymerization system, which is the primary indispensable requisite for the attainment of the object of the present invention.

By the halogen-containing polymer latex substantially free from an emulsifier (hereinafter referred to as the present latex) is meant a latex produced, in the complete absence of an ordinary low-molecular weight emulsifier, or produced according to the ordinary emulsion polymerization process in the presence of less than 2 weight %, preferably less than 1.5 weight %, of such an emulsifier. The latex is produced from a vinyl halide such as vinyl chloride, vinyl bromide, etc. and/or a vinylidene halide such as vinylidene chloride, vinylidene bromide, etc. or if necessary together with another vinyl monomer copolymerizable with these. The solid content of the latex is generally 10 to 60 weight %, preferably 20 to 50 weight %, and the polymer particles of preferably less than $0.5\mu$ are stably dispersed.

There is no limitation on the method of producing the present latex. In this connection, a latex described for example in Japanese Patent Publication No. 31280/1976 may be used. This latex is produced using as the dispersing agent a water-soluble polymer containing combined therewith a carboxyl group and sulfonic acid group, usually produced by solution polymerization using water as the medium from an ethylenically unsaturated carboxylic acid or a salt thereof and an ethylenically unsaturated sulfonic acid or a salt thereof. This latex contains no emulsifier at all, and halogen-containing polymer particles less than $1\mu$, preferably less than $0.5\mu$, are stably dispersed in the latex. It is desirable that, when producing a polymerization system or a spinning solution, agglomeration of the latex does not occur;

upon polymerization there is no problem in viscosity increase or plating; and the halogen-containing polymer fine particles are finely and stably dispersed in the generated AN (co)polymer matrix.

Also, there may be used, in the presence of 0.1-2 preferably 0.5-1.5 weight % of an emulsifier as described in Laid-open Japanese Patent Application No. 113885/1978, a latex produced by polymerizing a halogen-containing vinyl polymer in the presence of a copolymerizable emulsifier composed of 0.5-15 weight % of a vinyl polymer containing polyoxyethylene units represented by the following general formula (A):

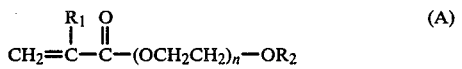

$$CH_2=\overset{R_1}{\underset{|}{C}}-\overset{O}{\underset{\|}{C}}-(OCH_2CH_2)_n-OR_2 \quad (A)$$

wherein $R_1$ represents H or $CH_3$, $R_2$ represents H, an alkyl group having less than 18 carbon atoms or $C_6H_4-(CH_2)_m-H$ wherein m is an integer from 0 to 20, and n is an integer from 4 to 50, and 0.5-10 weight % of an ethylenically unsaturated sulfonic acid or a salt thereof. In this case, the diameter of fine particles (less than $0.1\mu$) as well as chemical and mechanical stability will be greatly improved, and especially in the use of fiber production in which an inorganic solvent is used, agglomeration does not occur at all.

The vinyl monomers to be polymerized in an aqueous medium in which the above-mentioned halogen-containing polymer latex is present, include AN only or vinyl monomers containing more than 75 weight % of AN. When the quantity of AN is outside the lower limit, it is impossible for the resulting polymer to retain the intrinsic properties as an acrylic polymer, even by the method of the present invention. The vinyl monomers which may be copolymerized with AN if desired, include vinyl esters of saturated aliphatic monovalent carboxylic acids such as vinyl acetate, vinyl propionate, etc.; ethylenic unsaturated carboxylic acids, salts thereof and esters and amides thereof such as (meth)acrylic acid, etc.; ethylenic unsaturated sulfonic acids and salts thereof such as vinylsulfonic acid, (meth)acrylsulfonic acid, styrenesulfonic acid, sulfopropyl (meth)acrylate, acrylamide propanesulfonic acid, etc.; vinyl halides and vinylidene halides.

The mixing ratio of the present latex and the vinyl monomer can be suitably regulated by adjusting the polymer concentration in the latex which is present in an aqueous medium, the quantity of vinyl monomer to be charged to the polymerization system, etc. Although the mixing ratio is not limited, it is desirable for the attainment of the object of the present invention that the acrylic polymer should contain combined therewith 40-74 weight %, preferably 45-70 weight %, of AN and more than 15 weight %, preferably more than 17 weight %, of halogen atoms, based on the total quantity of the polymer to be finally obtained.

Next, the method of polymerization is described in detail. Although it is difficult to limit strictly the quantity of the present latex in the aqueous medium, it is desirable that the quantity of halogen-containing polymer in the latex, based on the quantity of vinyl monomer to be charged to the polymerization system, should be within the range of generally 1.5-150 weight %, preferably 5-120 weight %. Also, the quantity of vinyl monomer to be charged is desirably within the range of 5-40 weight % based on the total quantity of the polymerization system.

Also, it is necessary to add to the polymerization system a radical polymerization initiator as the polymerization catalyst which is liable to form graft linkage. By the action of such a catalyst, part of the AN (co)polymer formed about the halogen-containing polymer is graft-polymerized and therefore the compatibility of the halogen-containing polymer with the AN (co)polymer is greatly improved. As such radical polymerization initiators, there can be listed, for example, benzoyl peroxide, azobisisobutyronitrile, persulfates, hydrogen peroxide, redox initiators such as those composed of a persulfate or sodium chlorate and acid sodium sulfite or sodium sulfite, cerium salts such as ammonium cerium nitrate, etc. Among others, it is preferable to employ redox initiators or cerium salts. The polymerization temperature is desirably within the range of 30° to 60° C., preferably 40°-55° C., and the polymerization time is desirably within the range of 0.5 to 4 hours.

It is desirable to add to the polymerization system an inorganic salt, for example an alkali-metal salt of an inorganic acid such as hydrochloric acid, sulfuric acid, nitric acid, carbonic acid, etc. in a small quantity such as 0.01 to 2.0 weight % based on the vinyl monomer, since it facilitates the filtration and washing of the acrylic polymer finally obtained, and can prevent turbidity of the filtrate at the time of dewatering the polymer. If the quantity of such an inorganic salt added exceeds the upper limit of the above-mentioned recommended range, the latex present in the polymerization system agglomerates and therefore it is impossible to produce the desired polymer. It is also possible to add known flame retardants or synergetic flame retardants such as halogenated aromatic compounds, organic phosphoric compounds, organic tin compounds, antimony oxide, etc. or to mix them with the polymer formed. Such an embodiment is also included in the present invention.

The thus-obtained acrylic polymer is used suitably in such fields as paint additives and shaping materials, in which flame retardancy and the characteristics of AN polymers are required. Among others, when shaped into fibers, the polymer fully exhibits the desired characteristics. The method of shaping such fibers comprises dissolving the polymer in a known solvent for producing acrylic fibers to form a spinning solution, spinning the solution into fibers and after-treating the fibers. In the production process there is no problem and the polymer is shaped into flame-retardant acrylic fibers.

We have not yet clarified why the acrylic polymers according to the present invention have solved the problems of latex agglomeration and solubility in the solvent for AN (co)polymers together with all other undesirable problems in practical use such as delustering, coloring, dyed color unclearness, lack of bending elasticity, possesion of heat-shrinkability, etc., at an equal AN content in comparison with known copolymers of halogen-containing monomer and AN or mixtures of halogen-containing polymer and AN (co)polymer.

However, we suppose the reason is as follows:

By the method of the present invention, some graft-linkage is formed between the halogen-containing polymer and the AN (co)polymer, and the compatibility between them is improved, by which the problems of agglomeration, delustering, decrease of gloss, etc. of the halogen-containing polymer are solved, and at the same time the halogen-containing polymer fine particles present in the polymerization system are occluded into the AN (co)polymer generated, taking a structure in which the halogen-containing polymer particles are finely dispersed in the high AN content matrix. Thus the acrylic polymer according to the present invention, even at an equal AN content as a whole in comparison with the above-mentioned copolymers or polymer mixtures, is imparted with excellent flame retardancy while retaining the intrinsic acrylic polymer properties such as dyed color clearness, dyed color fastness, etc.

It is worthy of special mention that in the present invention polymers imparted with a high degree of flame retardancy can be produced while retaining the various intrinsic characteristics of acrylic polymers; and especially the fibers produced from the polymers have no problems in the production process, such as filter clogging, spinnerette clogging, filament breakage, etc. and are imparted with flame retardancy without impairment of transparency, gloss, dyed color clearness, etc. Thus the fibers have come to be used in the field of interior furnishing such as curtains, carpets, etc. and in the field of clothing for babies and children, in which fields the development of acrylic fibers has been heretofore difficult.

In the following the present invention will be explained in further detail by way of Examples. However, it should be understood that the scope of the invention is not limited by the Examples. Parts and percentages are shown by weight unless otherwise specified.

EXAMPLE 1

Methacrylic acid and sodium p-styrenesulfonate were mixed in the ratio of 70:30. To 100 parts of the mixed monomers, 2 parts of ammonium persulfate, 1.8 parts of acid sodium sulfite, 0.0015 part of ferrous chloride and 230 parts of deionized water were added and the mixture was subjected to polymerization for one hour at 70° C. under stirring. The solution of the thus-obtained water-soluble polymer was dissolved in water and was used for the following emulsion polymerization of vinyl chloride (VCl). The polymerization of VCl was conducted in an autoclave with the following charge composition:

| | |
|---|---|
| VCl | 40 parts |
| water-soluble polymer | 1.5 |
| ammonium persulfate (APS) | 0.2 |
| acid sodium sulfite (ASS) | 0.2 |
| ferrous chloride | 0.0004 |
| deionized water | 60 |

When the mixture was polymerized for 2 hours at a polymerization temperature of 40° C., polyvinyl chloride (PVC) latex of an average particle diameter less than 500 m$\mu$ was obtained at a polymerization ratio of nearly 100%.

Using the PVC thus obtained, polymerization was conducted with the following charge composition:

| | |
|---|---|
| Vinyl monomer | 100 parts |
| (AN/methyl acrylate (MA)/sodium methallylsulfonate (SMS) = 91/9/0.3) | |
| PVC latex | 127 |
| sodium chlorate | 0.5 |
| ASS | 0.7 |
| ferrous chloride | 0.001 |
| sodium nitrate | 0.5 |
| deionized water | 700 |

The mixture was polymerized for 3 hours at a polymerization temperature of 50° C., with the result that the polymerization ratio was 80%.

Ten parts of the thus-obtained acrylic polymer was dissolved in 90 parts of an aqueous 50% sodium thiocyanate to prepare a spinning solution, which was spun to form fibers in an aqueous 13% sodium thiocyanate solution at −3° C., and the resulting fibers were subjected to water-washing, stretching, drying and heat-treatment to obtain Fiber A of 10 deniers.

The knit LOI value of the thus-obtained fibers was 25. The fibers did not exhibit delustering and heat-shrinkage, and the dyed color clearness was very good. Upon observing the spinning solution through a microscope, it was apparent that the AN polymer formed the matrix phase and the fine particles of PVC were dispersed in the matrix, but agglomeration was not observed at all.

The properties of the fibers were measured or judged as follows:

(a) Delustering

After treatment in boiling water for 3 hours, the delustering was judged.

(b) Heat-shrinkage

After dry-heat treatment at 180° C. for 15 minutes, the presence or absence of shrinkage was judged.

(c) Dyed color clearness

The fibers were dyed in the usual way with an ordinary cationic dye, and the clearness of the dyed fibers was judged.

(d) Knit LOI

After 1/10′ S yarn was formed from 10 denier fibers in the usual way, the yarn was produced into a sheeting knit fabric having a weight of 300 g/m$^2$, and the knit LOI was measured according to JIS K-7201.

EXAMPLE 2

Fiber B was produced in the same way as described in Example 1 except that vinylidene chloride (VDC) was used in place of VCl.

Fiber C was produced in the same way as described in Example 1 except that AN/MA/VDC/SMS=77/8/15/0.3 was used as the vinyl monomer composition and 62 parts of the PVC latex was added.

Fiber D was produced in the same way as Fiber C except that the spinning solution was wet-spun in the usual way using the dimethylformamide solvent system, followed by post-treatment of the resulting fibers.

For comparison, Fiber E was produced by the organic solvent system spinning as was Fiber D, using an acrylic polymer produced according to the formulation described in Example 1 except that the vinyl monomer composition was changed to AN/MA/VDC/SMS=70/7/23/0.5 and 30 parts of the PVC latex was added.

Fiber F was produced in the same way as in Example 1 except that the PVC latex was produced using 3 parts of sodium lauryl sulfate in place of 1.5 parts of the water-soluble polymer.

A spinning solution was prepared by mixing the AN polymer produced according to the following formulation with the PVC latex described in Example 1 so that the ratio of the two became the same ratio as in Example 1, and from the spinning solution, Fiber G was produced in the same way as in Example 1.

| Vinyl monomer (AN/MA/SMS = 91/9/0.3) | 100 parts |
|---|---|
| sodium chlorate | 0.7 |
| ASS | 1.0 |
| ferrous chloride | 0.001 |
| deionized water | 700 |
| polymerization temperature | 50° C. |
| polymerization time | 3 hours |

An AN polymer was prepared according to the same formulation as for the above-mentioned AN polymer except that a vinyl monomer composition of AN/MA/VDC/SMS=61/4/34/1.0 was used. From the AN polymer, Fiber H was produced in the same way as Fiber D.

The results of the evaluation of the 7 kinds of Fibers (B–H) thus obtained are shown in Table 1 together with the results of Example 1.

TABLE 1

| Fiber name | Fiber-forming polymer | | Dispersibility of latex in spinning solution | Delustering | Fiber properties | | Knit LOI |
|---|---|---|---|---|---|---|---|
| | AN (%) | Cl (%) | | | Heat shrinkage | Dyed color clearness | |
| Present Invention | | | | | | | |
| A | 56 | 22 | good | no | no | ◉ | 25 |
| B | 56 | 28 | " | " | " | ◉ | 27 |
| C | 59 | 24.5 | " | " | " | ○-◉ | 26 |
| D | 59 | 24.5 | " | a little | " | " | 26 |
| Comparative Examples | | | | | | | |
| E | 61 | 24 | " | " | occurred | Δ | 26 |
| F | 56 | 22 | great agglomeration | " | no | " | 25 |
| G | 56 | 22 | agglomeration | occurred | " | " | 25 |
| H | 60 | 25 | — | " | occurred | " | 26 |

From the results in Table 1, it is clear that the products of the present invention can remarkably improve the various properties collectively.

What is claimed is:

1. In a method of producing flame-retardant acrylic fibers, which comprises producing an acrylic polymer, dissolving said acrylic polymer in an inorganic solvent to form a spinning solution, spinning said acrylic polymer in said solution into fibers and after-treating said fibers, the improvement wherein said acrylic polymer is produced by polymerizing, at a temperature of 30° to 60° C., a vinyl monomer containing more than 75 weight % of acrylonitrile, in an aqueous medium containing a radical initiator and a halogen-containing polymer latex substantially free from an emulsifier, said latex containing polymer particles of less than $0.5\mu$ stably dispersed therein, wherein the quantity of said latex is such that the quantity of halogen-containing polymer in said latex is 1.5 to 150 weight % based on the weight of said vinyl monomer.

2. The method as claimed in claim 1 wherein the acrylic polymer contains combined therewith 40–74 weight % of acrylonitrile based on the total quantity of the polymer finally obtained.

3. The method as claimed in claim 1 wherein the acrylic polymer contains combined therewith more than 15 weight % of halogen atoms based on the total quantity of the polymer finally obtained.

4. The method as claimed in claim 1 wherein 0.01 to 2.0 weight %, based on the vinyl monomer, of an inorganic salt is present in the aqueous medium.

5. The method as claimed in claim 1 wherein the vinyl monomer is charged into the polymerization system in a quantity of from 5 to 40 weight % based on the total quantity of the polymerization system.

6. The method as claimed in claim 1 wherein the polymerization is conducted for 0.5 to 4 hours.

* * * * *